(12) United States Patent
Perlo et al.

(10) Patent No.: US 7,592,712 B2
(45) Date of Patent: Sep. 22, 2009

(54) ELECTRIC GENERATOR DEVICE ACTUATED BY A FLUID FLOW

(75) Inventors: Piero Perlo, Orbassano (IT); Marco Ottella, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 311 days.

(21) Appl. No.: 11/826,520

(22) Filed: Jul. 16, 2007

(65) Prior Publication Data
US 2009/0001731 A1 Jan. 1, 2009

(30) Foreign Application Priority Data
Jul. 31, 2006 (EP) .................................. 06425549

(51) Int. Cl.
H02P 9/00 (2006.01)
H01L 41/08 (2006.01)

(52) U.S. Cl. .............................. 290/55; 290/44; 310/339

(58) Field of Classification Search .................... 290/43, 290/44, 54, 55; 310/339, 338
See application file for complete search history.

(56) References Cited

U.S. PATENT DOCUMENTS 5,306,183 A 4/1994 Holt et al.
7,282,838 B2 * 10/2007 Zanella et al. .............. 310/339

FOREIGN PATENT DOCUMENTS

| DE | 36 38 129 | 5/1988 |
|---|---|---|
| EP | 1 621 562 | 2/2006 |
| WO | 01/97742 | 12/2001 |
| WO | 03/056173 | 7/2003 |
| WO | 03/087571 | 10/2003 |
| WO | 2004/098023 | 11/2004 |
| WO | 2005/027318 | 3/2005 |
| WO | 2006/065248 | 6/2006 |

OTHER PUBLICATIONS

Honda et al.: "Using the Halback Magnet Array to Develop an Ultrahigh-Speed Spindle Motor for Machine Tools," IEEE Industry Applications Society Annual Meeting, New Orleans, LA, Oct. 5-9, 1997, pp. 56-60.

* cited by examiner

*Primary Examiner*—Nicholas Ponomarenko
(74) *Attorney, Agent, or Firm*—Nixon & Vanderhye P.C.

(57) ABSTRACT

An electric generator device comprising a panel bearing one or more electric generating machines each including a stator and a rotor concentric and substantially co-planar. The rotor is supported in rotation by the stator and presents a central part bearing one or more blades of a fan. A flow of fluid causes the fan and in consequence the rotor (R) to rotate. The rotor bears along its periphery a plurality of magnetic poles whose magnetic fields link with windings borne by the stator, for the induction of an electric current in the windings. The rotor is supported in rotation within the stator through magnetic means of support.

37 Claims, 18 Drawing Sheets

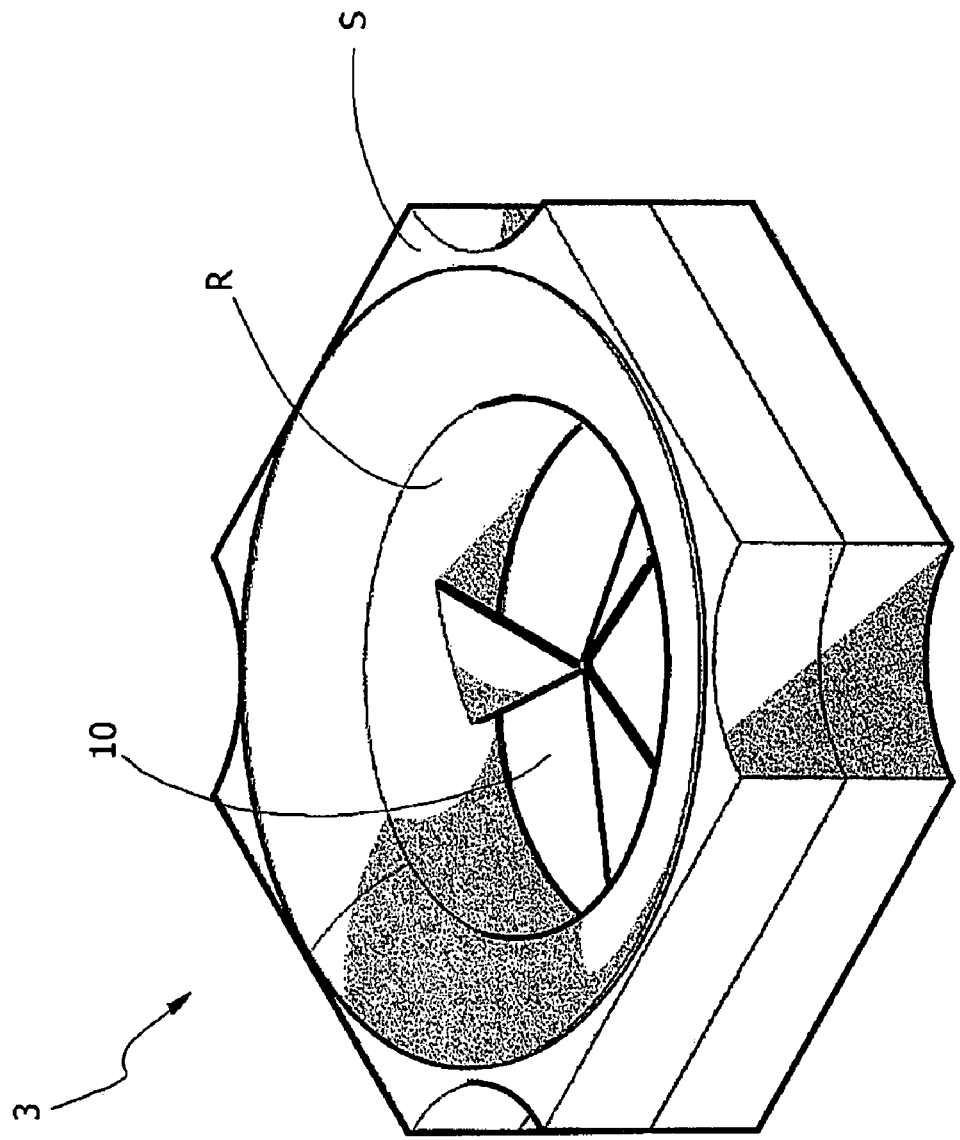

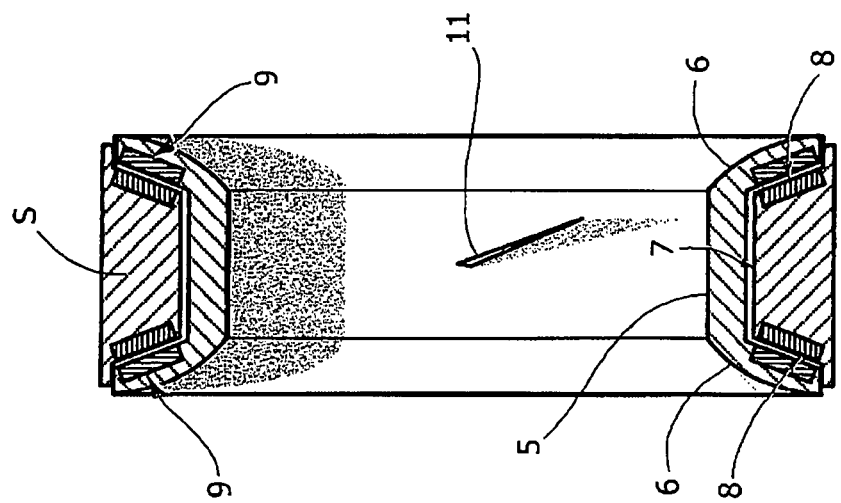
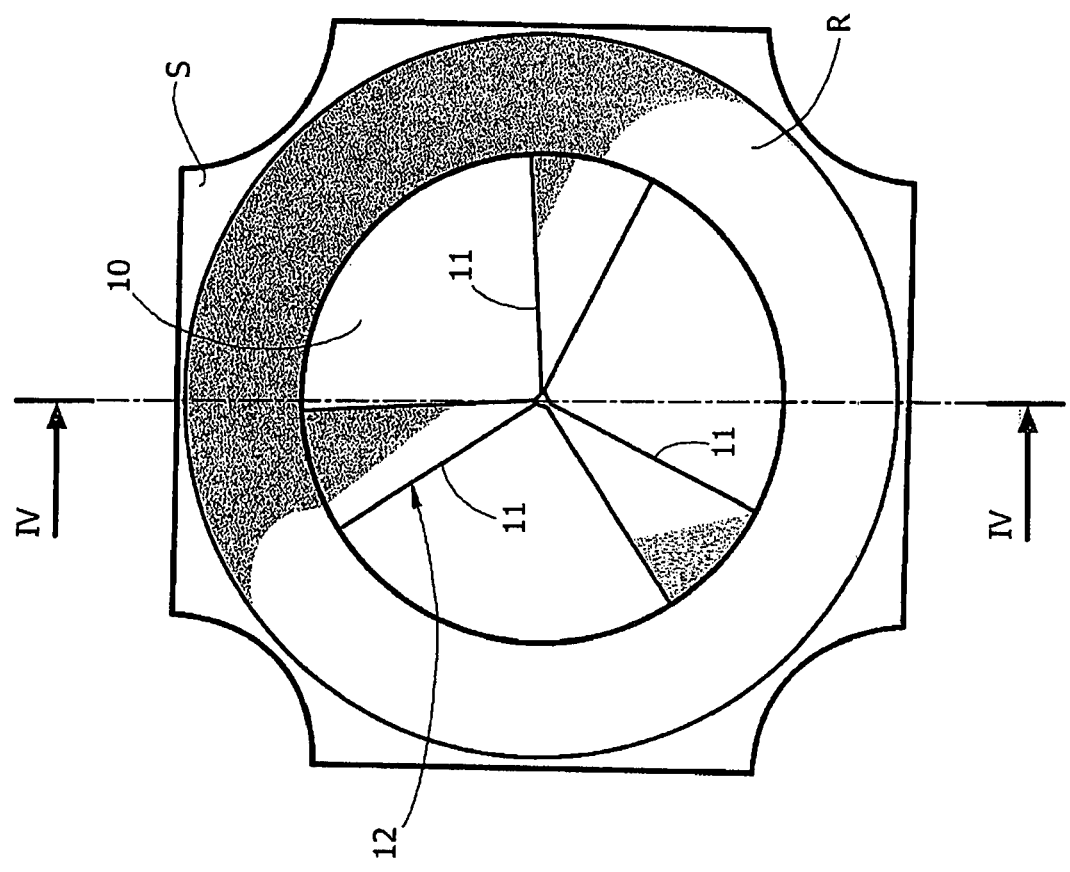

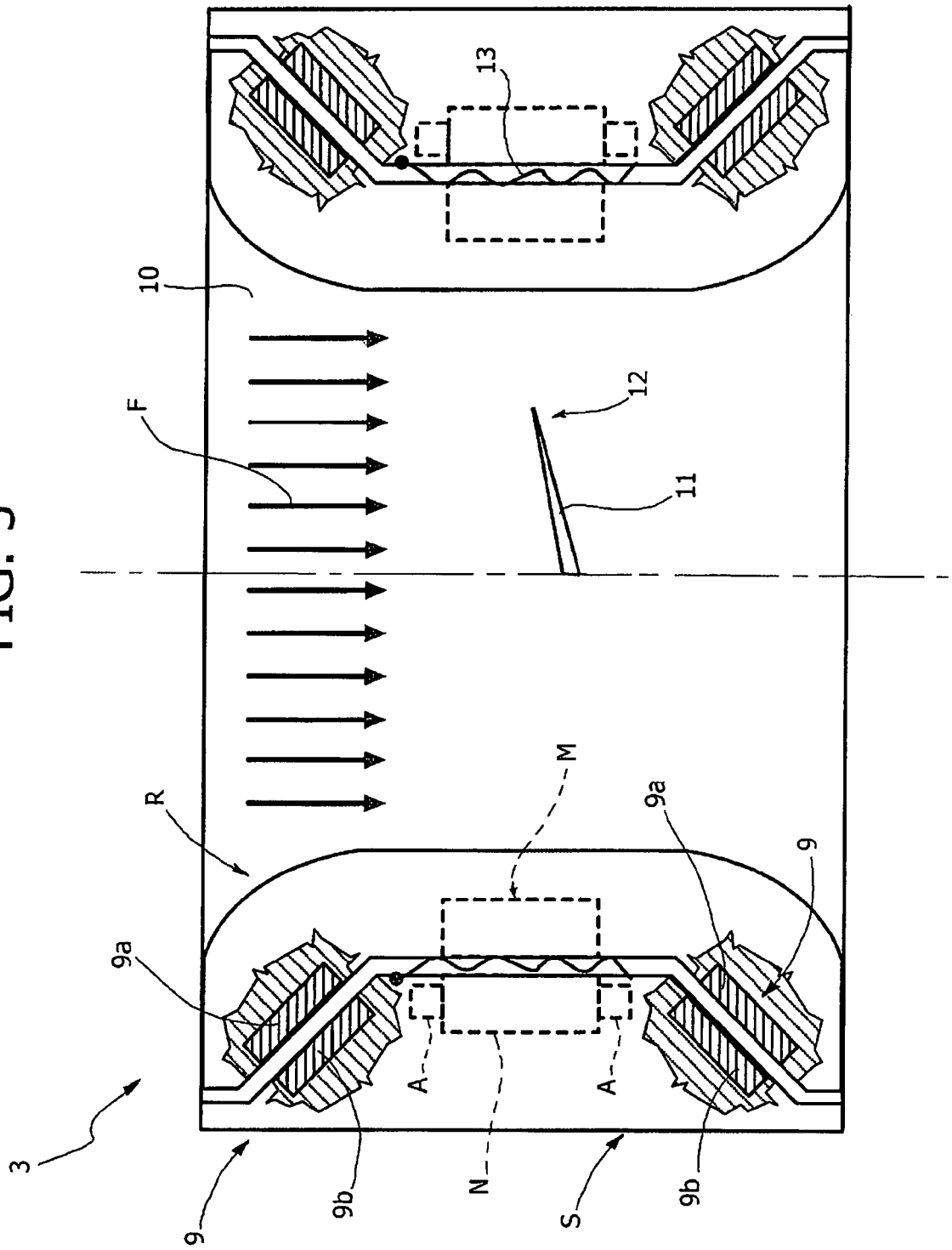

US 7,592,712 B2

ELECTRIC GENERATOR DEVICE ACTUATED BY A FLUID FLOW

This application claims priority to EP 06425549.0 filed 31 Jul. 2006, the entire contents of which are hereby incorporated by reference.

BACKGROUND OF THE INVENTION

The present invention relates to electric generator devices that can be actuated by a fluid flow, in particular, although not exclusively, to wind turbines.

SUMMARY OF THE INVENTION

The purpose of the invention is to produce a generator device that presents a simple, light structure of reduced size and that has high efficiency.

In view of achieving this purpose, the subject of the invention is an electric generator device, comprising a panel bearing one or more generators each comprising an electric generator machine including a stator and a rotor, in which the rotor, acting as an inductor, is in the form of a ring bearing a distribution of magnetic poles along its periphery and having a central part bearing one or more fan blades and in which the stator is in the form of a ring surrounding the rotor and bearing windings capable of linking the magnetic field generated by said magnetic poles when the rotor is caused to rotate by a fluid flow activating said fan, and in which the rotor is supported in rotation by the stator through magnetic means of support.

In a first configuration, the rotor presents a central opening solely occupied by one or more fan blades destined to be actuated by a fluid flow directed parallel to the axis of the rotor. In a second configuration, the rotor bears a fan projecting axially from the body of the rotor and of the stator, destined to be actuated by a fluid flow substantially orthogonal to the axis of the rotor. In both configurations the fan struck by the fluid flow places the rotor, which is disposed substantially in a co-planar fashion with the stator and inside it, in rotation. Use of magnetic means of support without contact enables resistance to rotation to be reduced to a minimum obtaining in consequence the possibility of causing the rotor to rotate at a relatively high speed even when the speed of the fluid striking each fan is relatively low.

In the first configuration mentioned above, furthermore, the central opening of the rotor, being solely occupied by the fan (there being no rotor shaft) may be exploited with maximum efficiency for passage of the actuating flow.

In a preferred embodiment, both the rotor and the stator each present an intermediate cylindrical portion and two conical end portions, diverging outwards. For preference, the magnetic poles and the windings of rotor and stator are predisposed in the two co-axial cylindrical portions, whereas two magnetic bearings are predisposed in correspondence with the diverging end portions.

The said magnetic bearings may be of the passive type, that is comprising a permanent ring magnet borne by the rotor, that rotates inside a permanent ring magnet borne by the stator.

Such a configuration of passive magnetic bearings, based on the known theorem of Earnshaw, is not of itself stable in all directions, in the sense that it may be stable in one direction (for example the radial direction) and unstable in another direction (for example the axial direction). However it is possible, by optimising the shape of the bearings, their inclination, and the inclination of the prevalent axis of magnetisation of the permanent magnet, to minimise and almost eliminate the force that tends to bring the bearing into an unstable situation. Alternatively, or in addition, to overcome the hypotheses of the theorem of Earnshaw, magnetic bearings may be provided for each of which comprises for example a ring of permanent magnet borne by the stator, inside which rotates a ring borne by the rotor constituted of paramagnetic material, for example aluminium. The situation of instability also disappears when the two rings are in relative motion, since it is compensated by gyroscopic effects. It is thus possible to adopt strategies to maintain stability in a condition of no rotation, or of low-speed rotation, as will be described below.

According to a variant, three electric machines may be associated to one single rotor plus stator unit, one in correspondence with the intermediate cylindrical portions of stator and rotor, and the other two in correspondence with the diverging conical end portions of stator and rotor. Alternatively a number of electrical machines may be provided for in the cylindrical portion, for example of the transverse magnetic flux type, each having a single winding of the homopolar type.

The panel of the device according to the invention may bear a single relatively large generator, for example of diameter approximately one meter, or a matrix of micro-generators for preference disposed in a number of parallel rows, or else in convergent or divergent rows or in any other manner appropriate to create a distribution that, observed from a distance, appears aesthetically pleasing to the sight, including by combining a plurality of mini-generators of different sizes.

The mini-generators may also be disposed on more than one plane to achieve multi-stage configurations, and/or with partial superimposition of the stator parts of adjacent generators (that would offer resistance to the fluid) in order to exploit more efficiently the available space and the fluid flow that strikes the matrix structure.

The panel may be borne by a revolving structure so that it can be oriented in the direction of the wind or may also comprise a series of sub-panels, each of which can be oriented independently.

In the case of the above-mentioned second configuration with fan projecting from the body of the generator and activated by a flow transversal with respect to the axis of the rotor, such a possibility of orientation is less important, although it is not in any case excluded.

Further preferred characteristics of various embodiments of the invention are specified in the attached claims.

BRIEF DESCRIPTION OF THE DRAWINGS

Some preferred examples of embodiments of the invention will now be described with reference to the attached drawings, provided as an simple example without limiting intent, in which:

FIG. 2 is a perspective view of a mini-generator part of the panel in FIG. 1, FIG. 3 is a front view of the mini-generator in FIG. 2, FIG. 4 is a view in section along the line IV-IV of FIG. 3, FIG. 5 is a view in section in diagram form of the mini-generator according to the above-mentioned first configuration of the invention.

DETAILED DESCRIPTION OF THE INVENTION

Figure 1:
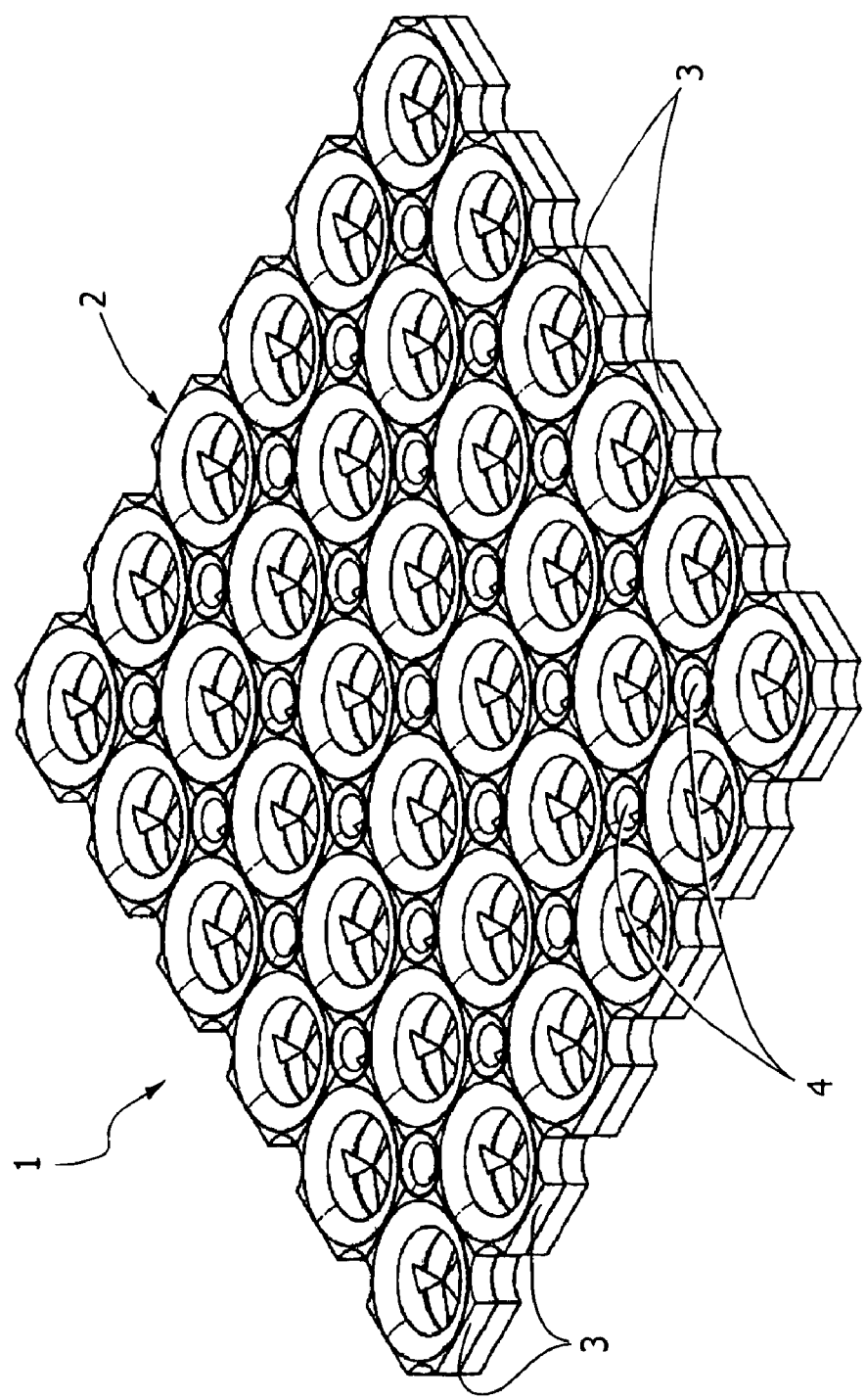
FIG. 1 is a perspective view of a panel of generators according to the above-mentioned first configuration of the invention, in which the individual generators are struck by a fluid flow in a direction substantially parallel to the axes of their rotors

In FIG. 1, number 1 indicates overall a device to generate electric energy comprising a panel 2 consisting of a matrix of mini-wind-turbines 3 (in this description, whenever reference is made to wind turbines it is intended also to include the generic case of generators actuated by a fluid flow of any type, not necessarily by means of the wind) disposed in a number of parallel rows. The dimensions of the panel 2 may for example be in the order of 1 m×1 m and its bearing structure may be of metallic or plastic material. For preference, in the areas of the panel between the various wind turbines 3, openings 4 may be provided to reduce the stress due to the wind to which the structure bearing the panel is subjected. This structure may for example consist of a column made in such a way as to enable the panel to be oriented orthogonally to the wind. The panel may also comprise a number of sub-panels, each independently orientable in the wind. A device of this type is for example capable of installation along the side of a road or on an infrastructure standing above the road, to supply electricity to electric devices situated along the road, such as light signals, sensor devices or others.

Instead of the matrix of wind turbines, as has been said, it is possible to provide for a single wind turbine, for example of diameter in the order of one meter or less. A device of this type may for example be associated with the post of a street lamp to generate electricity to supply the lamp.

With reference to FIG. 2, an essential characteristic of each wind turbine 3 lies in the fact that it consists of an electric machine comprising a stator and a rotor caused to rotate by a fan destined to the activated by a fluid flow directed substantially parallel to its axis. In this first configuration of the device according to the invention, the fan, the rotor and the stator are substantially co-planar and situated one inside the other. In particular, the rotor R consists of a ring (see also FIG. 4) mounted so that it can rotate inside a stator S, likewise of annular form. The rotor R, in the preferred example of embodiment illustrated in the drawings, presents an intermediate cylindrical portion 5 and two end portions 6 of conical form divergent outwards. The stator S likewise presents a central opening within which the rotor R can rotate, having an intermediate cylindrical portion 7, that receives the cylindrical portion 5 of the rotor R, and two end portions 8 of conical form divergent outwards, that receive the end portions 6 of the rotor R. Again in the case of the preferred embodiment, the rotor R is supported in rotation inside the stator S without making contact, through two magnetic bearings 9 situated in correspondence with the divergent conical end portions 6 of the rotor R.

In correspondence with the intermediate cylindrical portion 5, the rotor R bears a distribution of magnetic poles along its periphery (not illustrated). The intermediate cylindrical portion of the stator S in its turn bears windings (not illustrated) destined to link the magnetic field generated by the magnetic poles borne by the rotor R when the latter is caused to rotate. For this purpose, the rotor R presents a central opening 10 that, in consequence of the geometry described above, presents an intermediate cylindrical portion and two conical end portions diverging outwards. The cylindrical wall of the intermediate portion 10 of the central opening of the rotor supports a plurality of blades 11. The space of the opening 10 is solely occupied by these blades. In other words, the rotor is not supported in rotation through a central shaft, rather solely externally by the stator. Thus the central opening of the rotor is completely exploited for the passage of the flow of air destined to actuate the fan, indicated overall with the reference number 12. In the example illustrated, the blades 11 of the fan 12 each present a wider base in correspondence with the wall of the rotor and become progressively narrower towards the centre where they are connected to the other blades. However, it would theoretically also have been possible to provide for blades 11 that project from the wall of the rotor R and do not meet at the centre of the rotor.

FIG. 5 illustrates in diagram form the operating principle of the device. A fluid flow F passing through the central opening 10 of the rotor R causes the rotating magnetic field generated by the permanent magnets borne by the rotor R to be linked by the windings borne by the stator, at the ends of which a difference in potential is created. Each of the magnetic bearings 9 comprises two permanent ring magnets 9a, 9b facing one another, borne respectively by the rotor R and by the stator S in correspondence with their divergent conical portions. Alternatively, the permanent magnet 9a or 9b may be replaced by a ring of para-magnetic material, for example aluminium.

As an alternative to passive magnetic bearings 9, from the theoretical standpoint active magnetic bearings might be used, provided with a position sensor and an appropriate electronic control circuit able to maintain the position of stability by regulating the magnetic field generated by the permanent magnets, by means of a magnetic counter-field created by auxiliary windings, supplied with power by the generator itself or by a buffer battery.

Alternatively, said counter-field windings may be integrated into the machine itself, also utilising, through an appropriate electronic circuit, the same windings that link the field generated by the permanent magnets and used to extract the energy produced by rotation of the rotor.

As may be seen in FIG. 5, the divergent truncated-cone portions of the rotor also act as a guide for the air flow F into and out of the central opening 10 of the rotor.

In operation, the fluid flow F causes the fan 12, and in consequence the rotor R bearing a series of magnetic poles P, to rotate. This rotation causes an induced electric current within the winding A housed within the hollows C in the stator core N of the electric machine, this core being borne by the stator S.

In a variant, the stator S may include a number of windings A located not only in correspondence with the cylindrical portion, but also with the conical end portions of the stator co-operating with corresponding magnetic poles borne by the rotor, both in correspondence with the cylindrical portion and in correspondence with its conical end portions. One or more windings may also be provided for that are capable of producing a magnetic field to regulate the relative position of the rotor with regard to the stator.

In the preferred embodiment, the permanent magnets 9a, 9b of the magnetic bearings and also the permanent magnets P of the rotor of the electric machine M can if preferred be made of thin layers of a granular composite material of the Sm—Co—Fe type, in order to reduce the overall weight and increase the efficiency of the device. The body of the stator is preferably of soft magnetic composite (SMC) material, if preferred with variable density and permeability, that is to say with inclusions of elementary particles (magnetic domains) of variable density, including the case of ordered composite in which the elementary magnetic domains are included in the inorganic, or preferably polymeric organic, matrix following a predetermined order capable of defining a preferential direction of the magnetic flux.

Theoretically, "ironless" structures might also be provided for, that is to say stator windings supported free of any structure of ferromagnetic material generally used to concentrate the magnetic flux, this in order to ensure lightness and annul any "magnetic friction" effect commonly known as cogging.

The body of the fan 12 is preferably of ultra-light plastic or nano-composite material, for instance montmorillonite, or of the polymeric type or with carbon nanotubes or in general fibrous carbon polymer.

Figure 6:
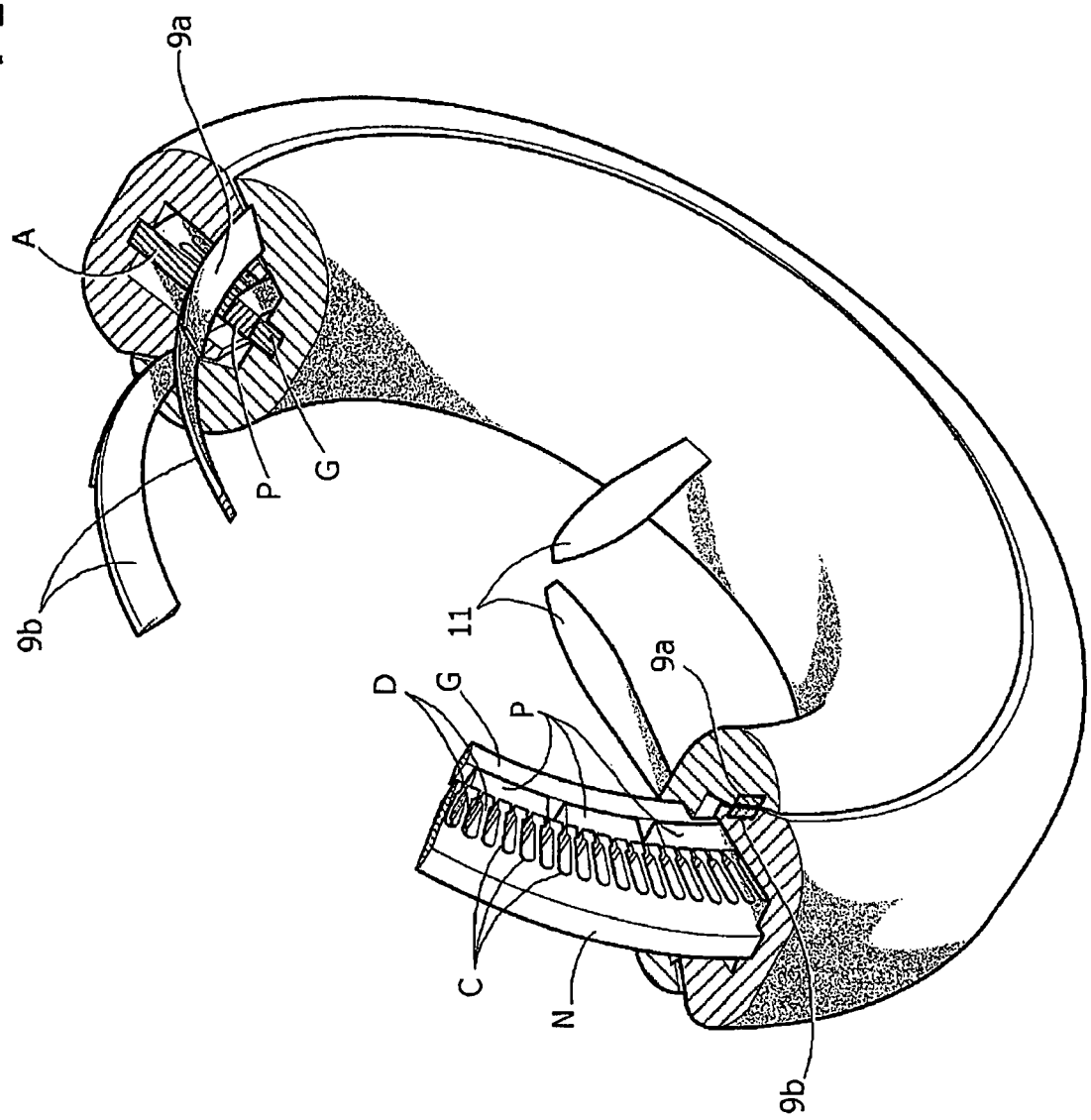
FIG. 6 is a partial perspective view with partial section that shows in detail a concrete embodiment of the mini-generator in FIG. 5, in its component parts.

FIG. 6 shows a plane section of the mini-generator, in which the parts described in FIG. 5 are visible from a different standpoint, and in particular the stator of the electric machine M consisting, in the preferred configuration, of a disc of ferromagnetic material (for example SMC), in which hollows (C) are practised capable of housing windings (not shown) that link the magnetic field generated by the permanent magnets of the rotor creating, in the inner region of the disc, an alternation of hollows (C) and teeth (D). The rotor of the electric machine M is integral with the rotor R of the device and presents in its innermost part a yoke (G), in the preferred form of ferromagnetic material (for example SMC) and, in its outermost part, an alternation of permanent magnets (P) disposed in such a way as to create an alternation of North and South magnetic poles that energises the windings of the stator when the rotor is caused to rotate. In a variant, the rotor may consist of a plurality of layers of composite magnetic material with variable density, residual magnetisation and permeability, again disposed in such a way as to create an alternation of North and South magnetic poles. In another variant the rotor of the electric machine M may consist of a plurality of permanent magnets disposed in a configuration, known to the art, the so-called "Halbach array", in order to reduce the weight and dimensions of the rotary part and consequently to reduce inertia.

Figure 7:
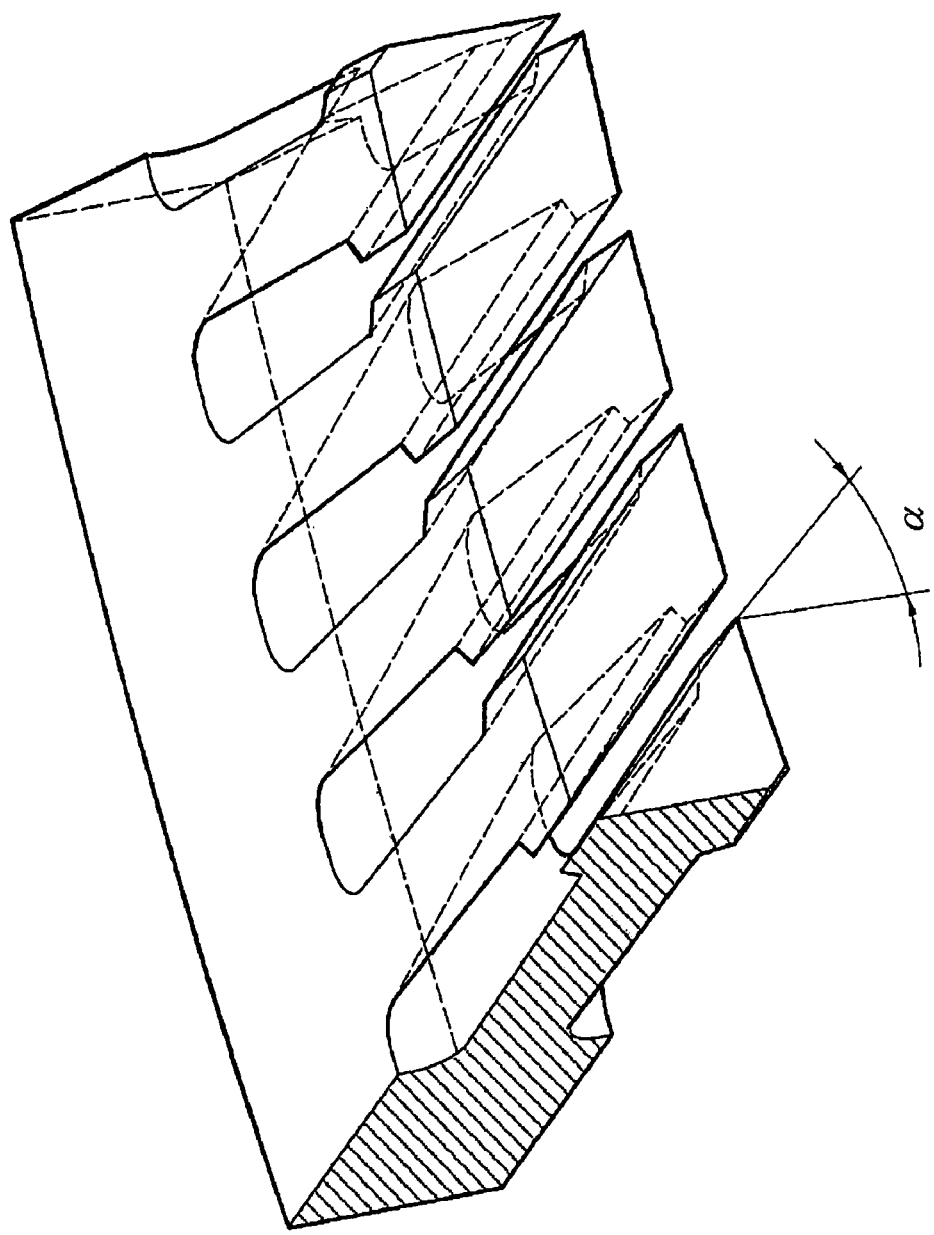
FIG. 7 shows, at an enlarged scale and in perspective view, a portion of the stator of the electric machine in FIG. 6, according to a variant that entails an oblique orientation (skewing) of the hollows of the stator.

FIG. 7 shows a variant of the stator of the electric machine made with a strategy known to the art, the so-called "skewing", that consists in making the hollows inclined by an angle (α) with regard to the axis of rotation of the machine, selected in such a way as to reduce the "magnetic friction" between stator and rotor of the electric machine that, if left free to rotate tend to situate themselves in the configuration of least reluctance, offering resistance to starting the rotor. This angle, according to the known art, is usually selected in such a way that the hollow is inclined by a full pitch of the hollow or by a fraction of such pitch. A similar strategy might, alternatively or jointly, be practised also on the rotor magnets, although this would be more costly.

Figure 8:
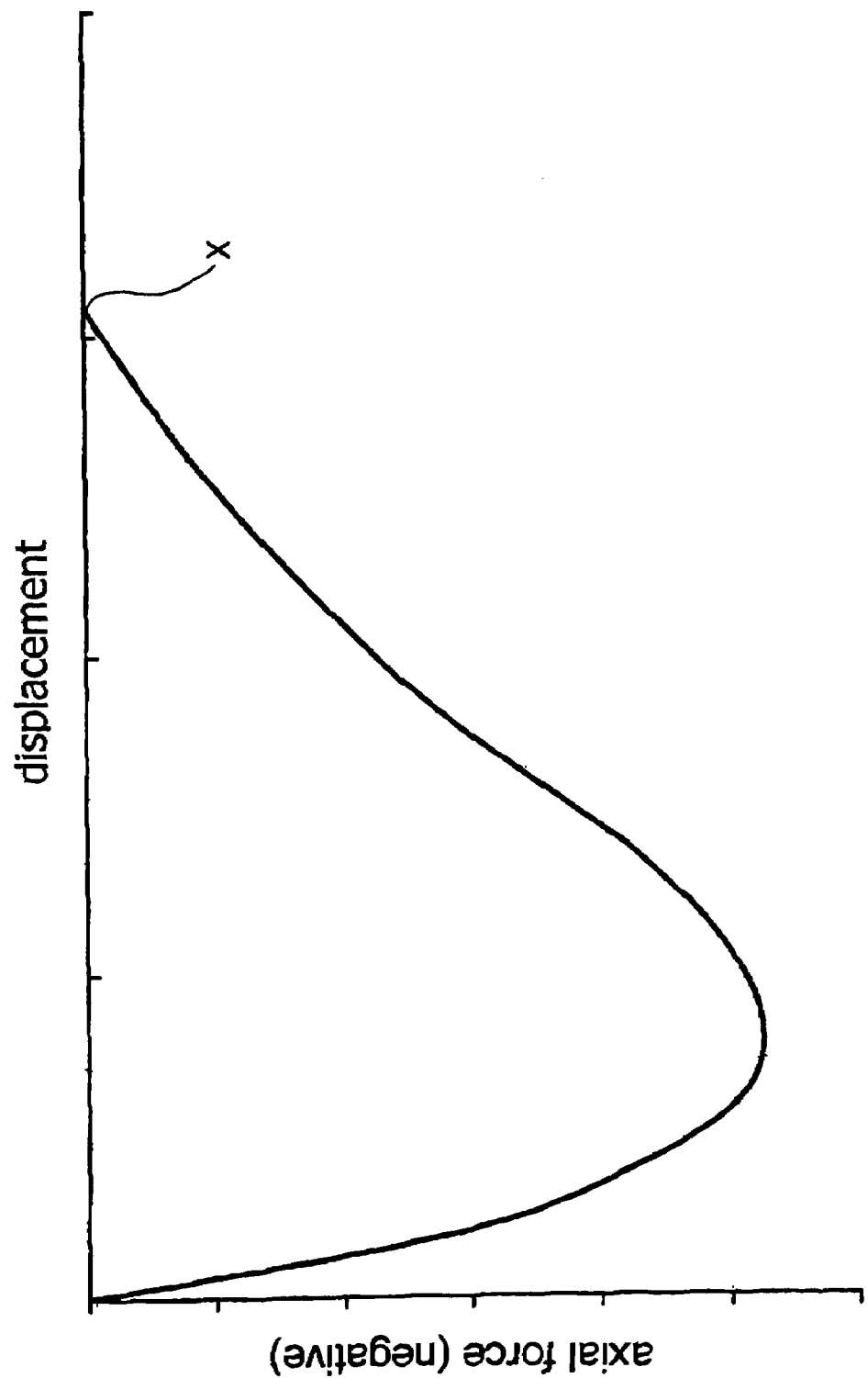
FIG. 8 is a Cartesian representation of the trend of axial force generated by the interaction between the internal and the external bearing, as the relative axial displacement varies.
Figure 9:
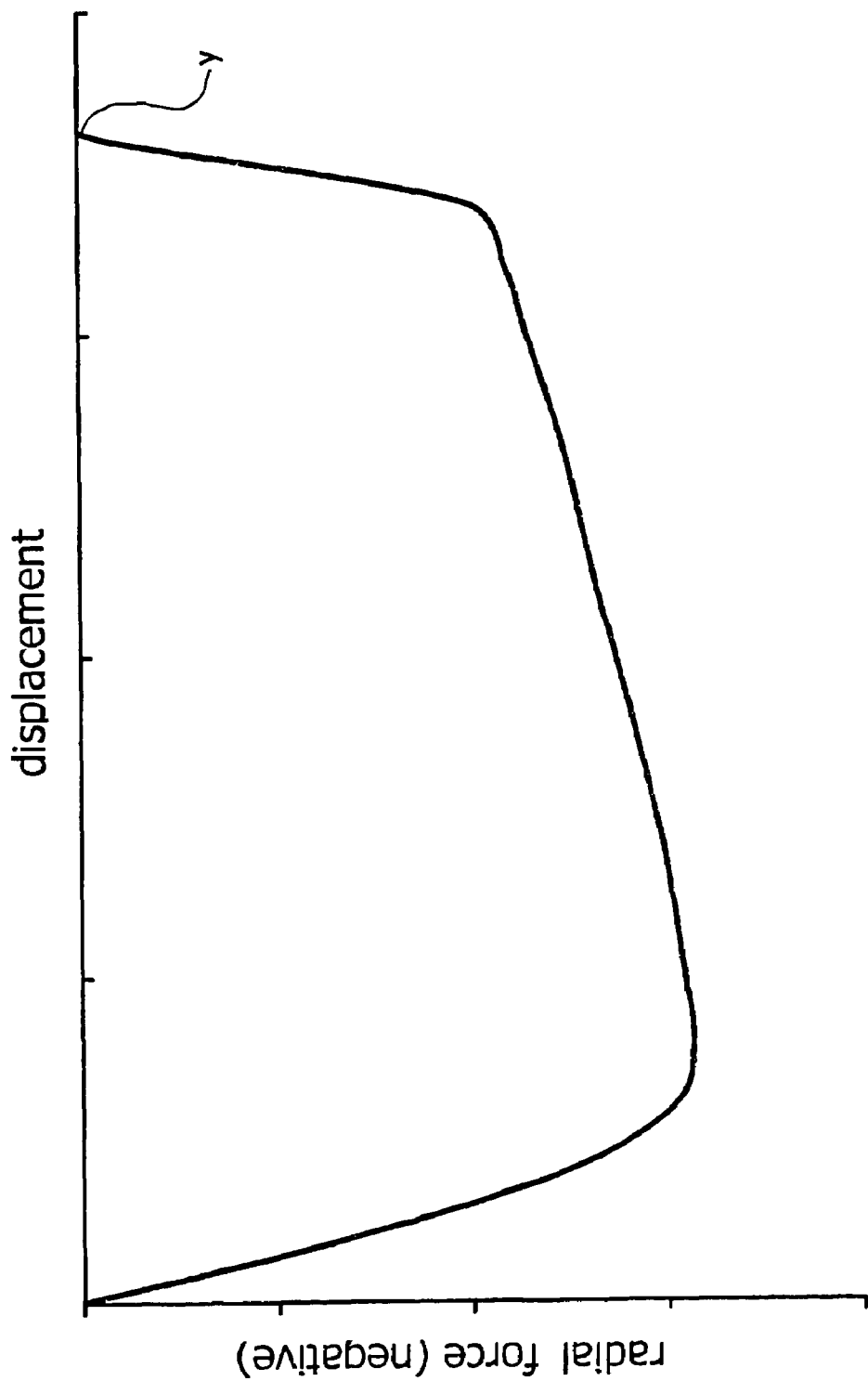
FIG. 9 is a Cartesian representation of the trend of radial force generated by the interaction between internal and external bearing, as the relative radial displacement varies.

FIGS. 8 and 9 show an example of the trend of the force exchanged between the bearings as the axial displacement varies (FIG. 8) and as the radial displacement varies (FIG. 9) with respect to the central position, in the case of a pair of magnetic bearings consisting of concentric truncated-cone rings with prevalently axial magnetisation and with magnetisation vector directed towards the air space between the two bearings. As may be seen the system guarantees a small area of stability around the central point, both for the axial force and for the radial force. Once the point X has been passed with regard to axial displacement, or the point Y with regard to radial displacement, the system enters into a zone of instability, since the force, no longer being negative, tends to bring the inner ring into a position even more distant from the central point. It is thus necessary to guarantee, through appropriate mechanical devices, that at low velocity or at rest the system never leaves said zone of stability.

For example, it is possible to insert into the air zone between stator and rotor a flat spring or flexure 13 (FIG. 5), of circular conformation having one edge of one extremity anchored to the stator S and an undulation whereby, with the rotor R stationary, the area of contact both with the stator S and with the rotor R is minimum.

At running speed, the flexure will stretch by effect of air pressure, and will no longer be in contact with the rotor and no longer offer resistance to rotation, the stability of the bearing remaining guaranteed by gyroscopic effects, in agreement with what, from the theoretical standpoint, is determined by Earnshaw's theorem.

A similar strategy may be employed to guarantee stability in the axial sense.

Figure 10:
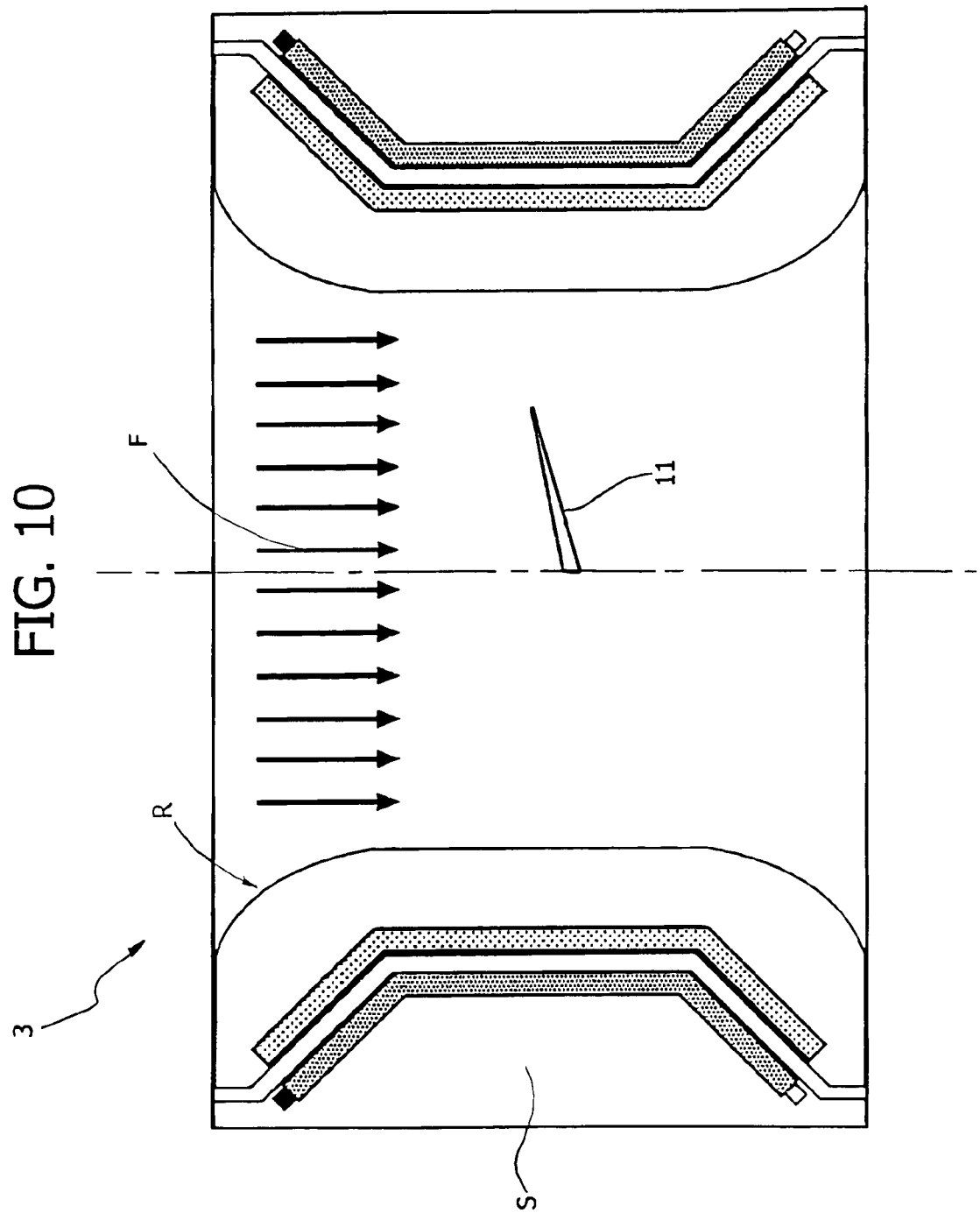
FIG. 10 is a variant of FIG. 5.

FIG. 10 illustrates in diagram form the variant in which stator windings are provided both in the cylindrical part and in the conical parts of the stator that also provide support to the rotor. The latter bears permanent magnets both in its cylindrical part and in its conical parts.

Figure 11:
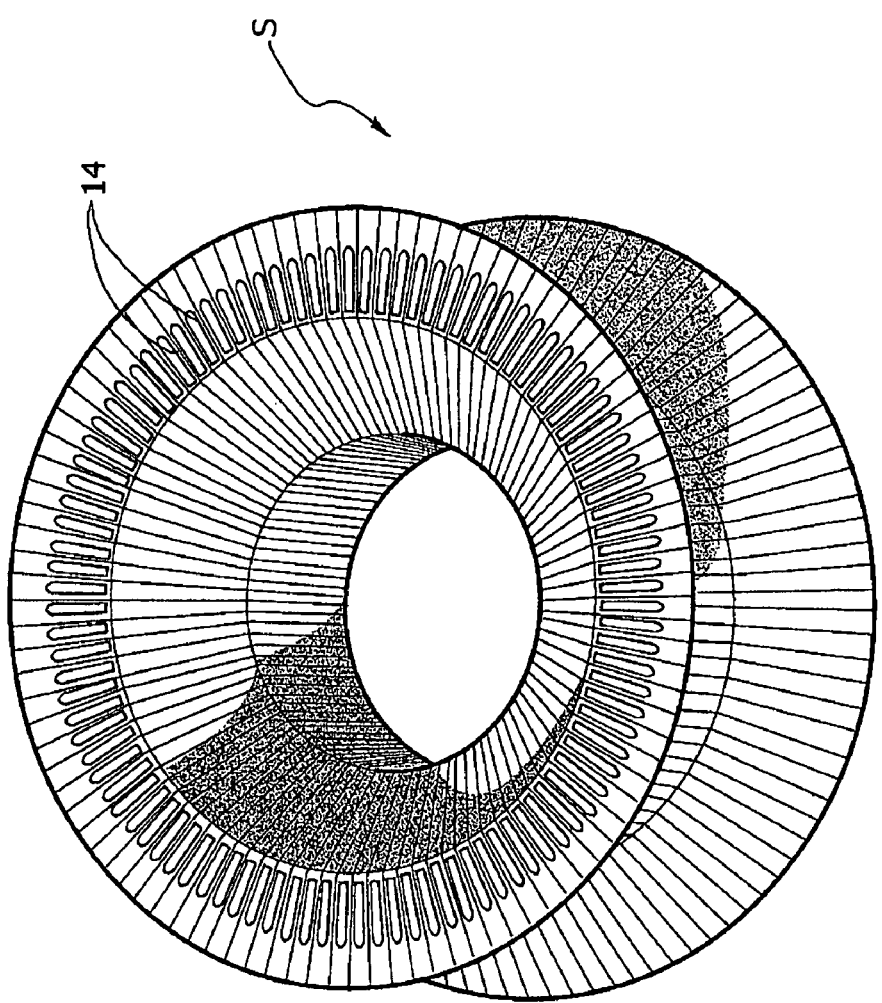
FIG. 11 is a perspective view of the stator that is part of the mini-generator in FIG. 10.

FIG. 11 is a perspective view of a stator according to the solution in FIG. 10, comprising a single body on whose inner surface hollows 14 are provided to receive the windings.

It is in any case possible to use other variants of electric generating machine of known art, such as for example but not exclusively, reluctance electric machines, permeance electric machines, set-back permanent magnet electric machines, transverse flow homopolar winding electric machines, constructed in ring form, without thereby departing from the sphere of the present invention.

Figure 12:
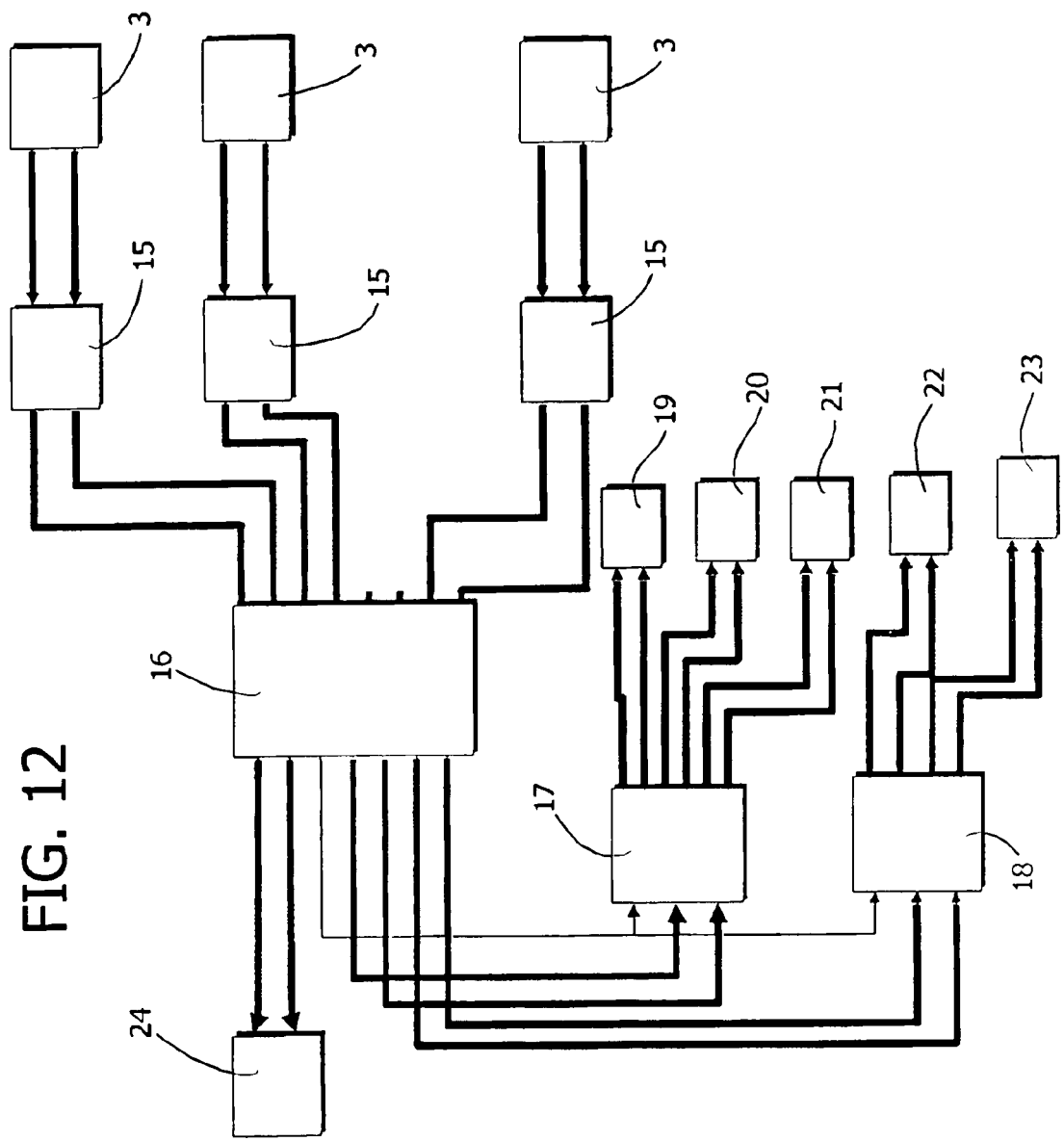
FIG. 12 illustrates a block diagram that shows the circuit connecting the generators.

FIG. 12 shows how n electric generators of the type indicated with 3 in FIG. 1 are connected each through a rectifier 15 to an energy management unit 16. The circuit includes a regulator and DC/DC converter 17 and a regulator and DC/AC converter 18 to regulate the voltage and convert it to the appropriate value for different types of loads 19, 20, 21, 22, 23 (6V loads, 12V loads, other DC loads, 220 AC loads, other AC loads). The energy management unit 16 guarantees connection of the individual electric generators to each other in such a manner as to have connections in series or in parallel, as well as managing energy transfer among the other elements of the circuit: generator-battery, generator-converter, battery-converter, and also for activation and management of the converters to give energy to the loads. An energy storage unit 24, typically a battery or alternatively a unit comprising super-condensers, provides for energy storage.

The unit 16 may make a connection in parallel or in series among the generators 3.

Figure 13:
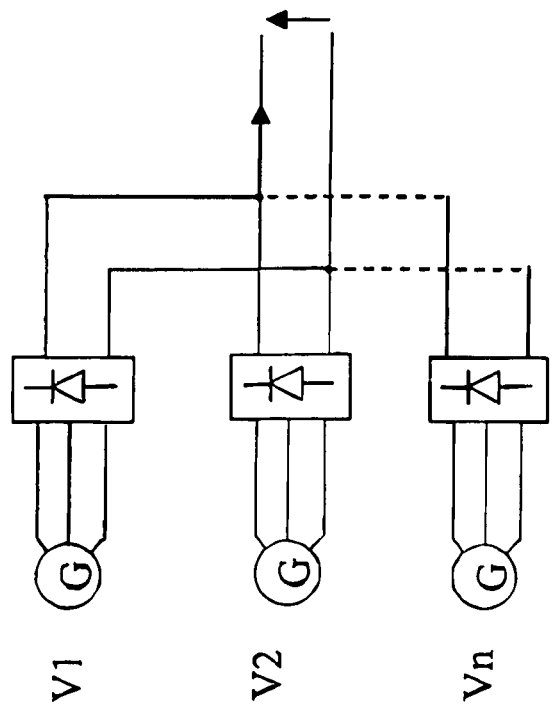

FIG. 13 illustrates a connection diagram of the generators in parallel. In case of perfect parallel connection, the current requested by the load would be equally subdivided among all the generators. Nevertheless there would be first and foremost the problem that the generators, although only slightly, are different from one another. Thus, for equal wind force, they would produce different voltages. Nevertheless, the rectifying bridges 15 would not allow voltages below that present on the bus to pass, so that only one generator at a time would supply energy. On the other hand there is also the problem that not all the generators are subjected to the same fluid force, so that they would in any case produce different voltages. In conclusion, also due to this problem only one generator at a time would supply energy. A single generator would thus have to support the entire load, with the possibility of impulse currents too high for the individual machine and this phenomenon might be the cause of demagnetisation through armature feedback.

Figure 14:
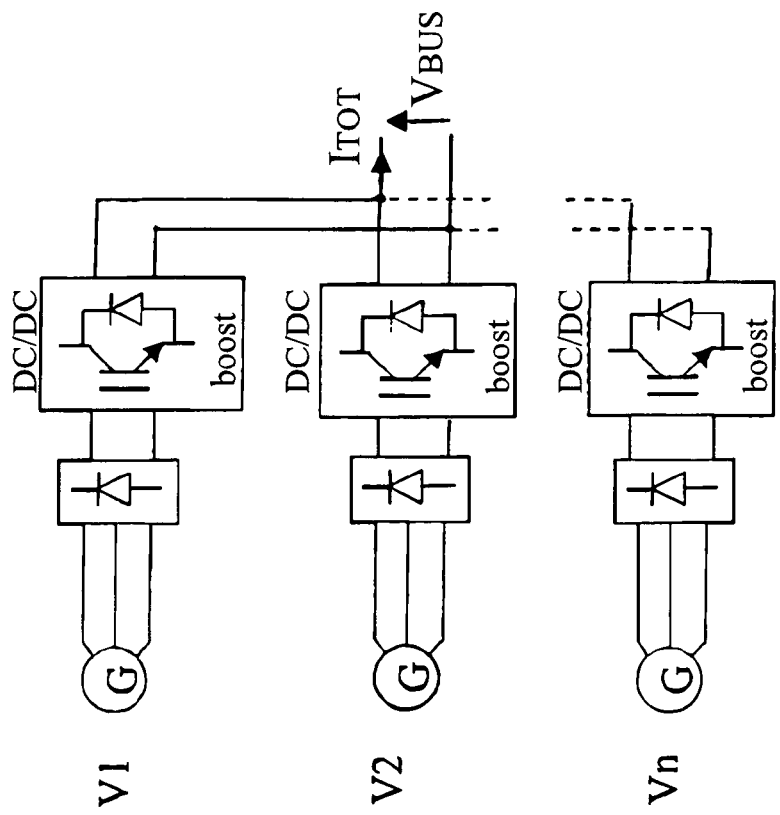
FIGS. 13-16 illustrate different possible schemes of connection between the generators.

In the light of resolving the above problem it is possible, for example, to make a connection of the type illustrated in FIG. 14, in which in output from each diode bridge 15 a DC/DC converter of the voltage-regulated boost type is inserted, that enables the same output voltage to be obtained from each generator+bridge+boost unit. In this way each unit supplies a current dependent on the power applied to the individual generator, but all units certainly give a contribution to the energy supply. The chief advantage deriving from the use of this configuration is that it is possible to obtain high current $I_{tot}$ with low $V_{bus}$ (depending on the desired $V_{bus}/V_i$ ratio).

Figure 15:
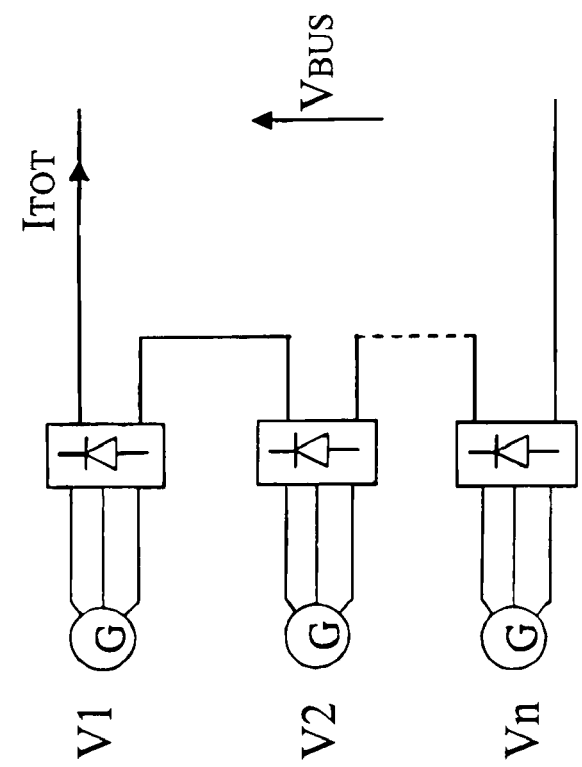

The energy management unit 16 may also connect the generators in series (FIG. 15). With this configuration, the $V_{bus}$ is equal to the sum of all the various Vs of all the generators. Thus, unlike the case of connection in parallel, all generators contribute to creating $V_{bus}$. Furthermore, for equal required power, to have a high $V_{bus}$ makes it possible to work with low current $I_{tot}$. In conclusion, provided that other intermediate converters are not used, connection in series enables the required power to be subdivided among all generators, although not equally.

Figure 16:
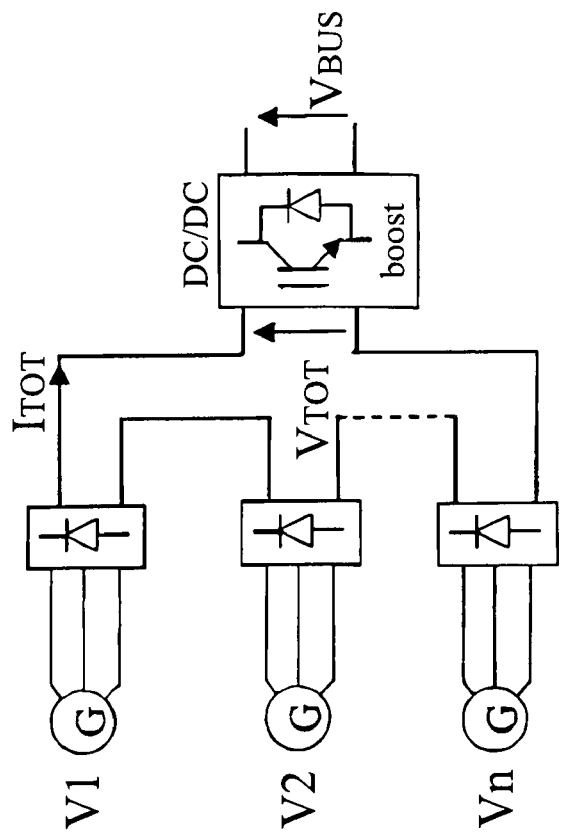

To obtain the desired boost voltages, connection of the generators in series and a boost converter are employed. The corresponding diagram is shown in FIG. 16.

The mini-generator may be equipped with a system (for example a voltage regulator) that enables loadless starting (that is without electric charges connected) of the rotor in conditions of very low fluid velocity, this for the purpose of exploiting the fluid flow, initially, to overcome inertia in the shortest possible time; the load will then be connected when operating velocity has been reached. This function may reside in the energy management unit or be commanded by the latter.

The device according to the invention lends itself to being set up on a panel mounted on a structure that enables orientation of the panel orthogonal to the wind. The panel may also the divided into sub-panels, each orientable independently from one another.

The device according to the invention lends itself to being caused to move by fluid flows entering from opposed directions although these, obviously, will cause the rotors to rotate in opposite directions but in any case they will continue to contribute to generating electric energy.

Figure 17:
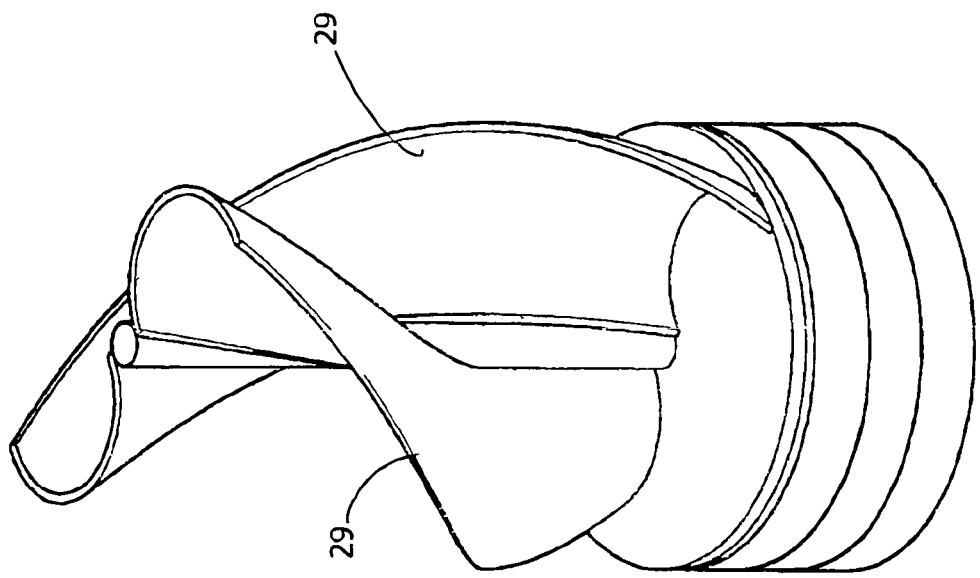
FIGS. 17 and 18 illustrate a perspective view and a section of an example of embodiment of a mini-generator according to the invention, in conformity with the above-mentioned second configuration, in which the fan is struck by a flow directed transversally with regard to the axis of the rotor.
Figure 18:
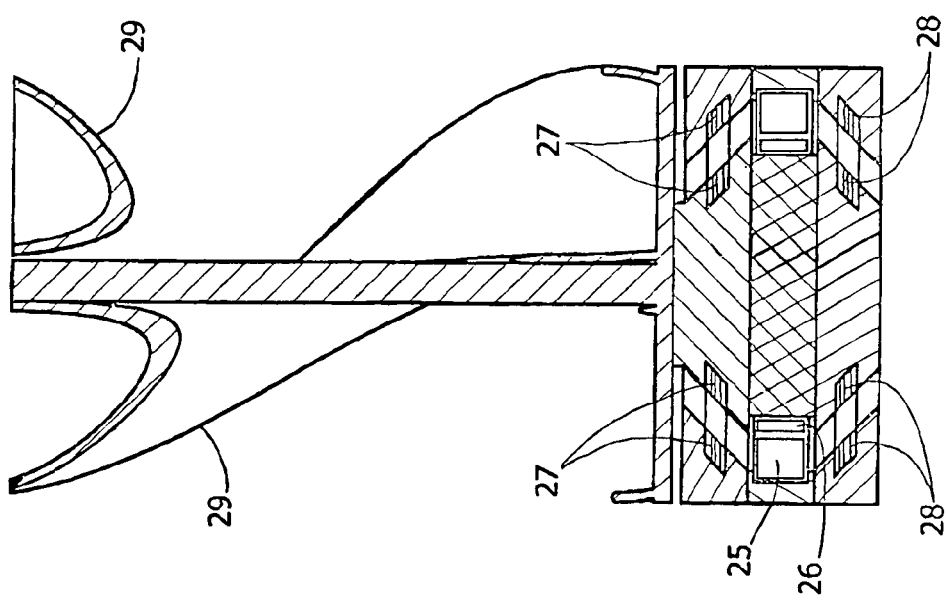

In its second configuration, the electric energy generating device also lends itself to be constructed in the VAWT configuration (that is to stay with a vertical axis of rotation) in the sense that in general the axis of rotation of the blades is substantially orthogonal to the wind direction and in particular it may be oriented vertically. Devices of this type present the advantage of not requiring devices to align the generator in the direction of the wind; they are in general less efficient than traditional solutions, but suitable for example for zones in which the direction of the wind, hot air or in general fluids is highly variable. The axis of rotation is generally mounted vertically, but may also be disposed horizontally, but always orthogonal to the principal fluid direction. FIG. 17 shows a perspective view of the device, whereas FIG. 18 shows a section of it along the axis of rotation. The blades 29 (in general one or more), the lower 28 and upper 27 magnetic bearings, the stator 25 and the rotor 26 of the annular electric generator may be seen.

Figure 19:
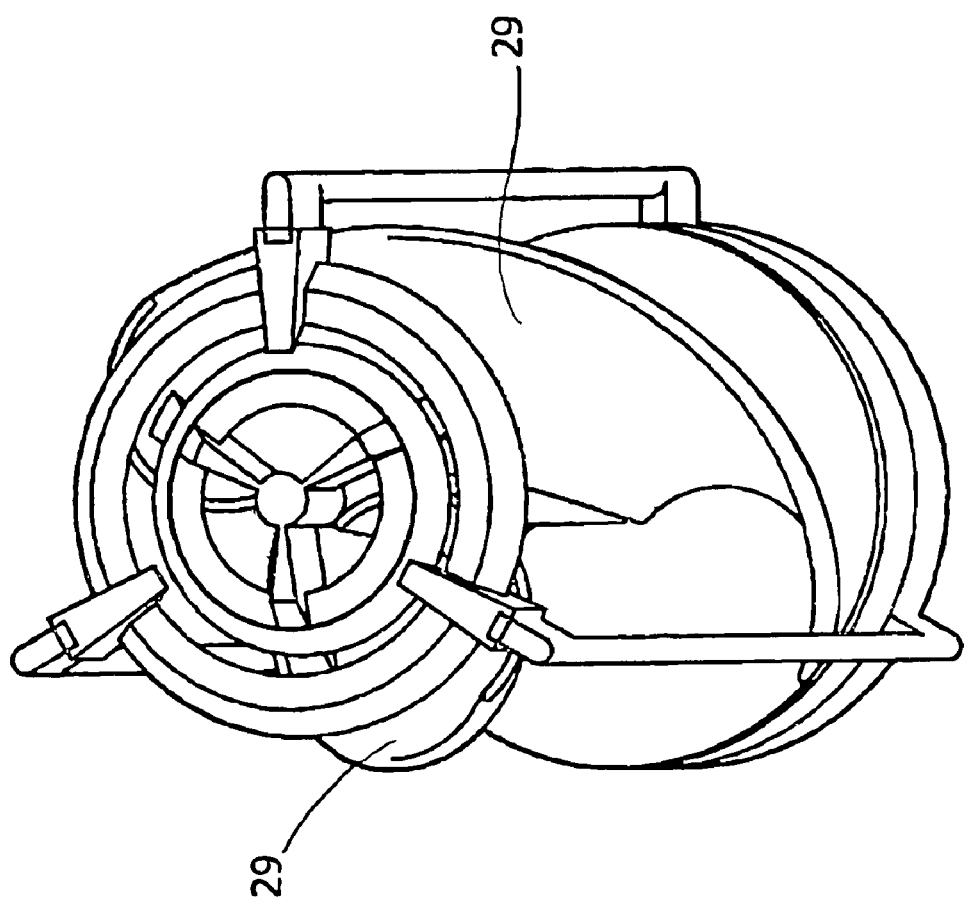
FIGS. 19 and 20 illustrate two variants of FIGS. 17 and 18.
Figure 20:
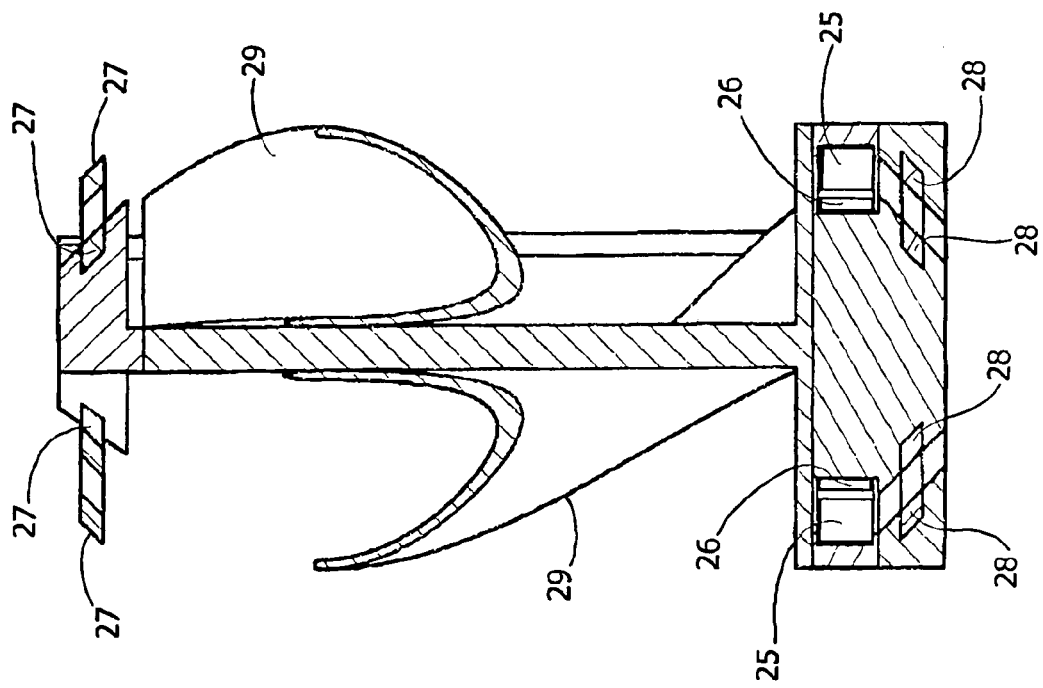

FIGS. 19 and 20 show, respectively, a perspective view and a section of a variant of the VAWT configuration, in which the pair of magnetic bearings comprises a magnetic bearing 28 placed at the base and a magnetic bearing 27 placed at the top of the blade. This solution is, for example, appropriate in situations in which the shaft is of such a length as to determine out-of-alignment forces that could not be supported by a pair of magnetic bearings placed entirely at the base of the device.

Figure 21:
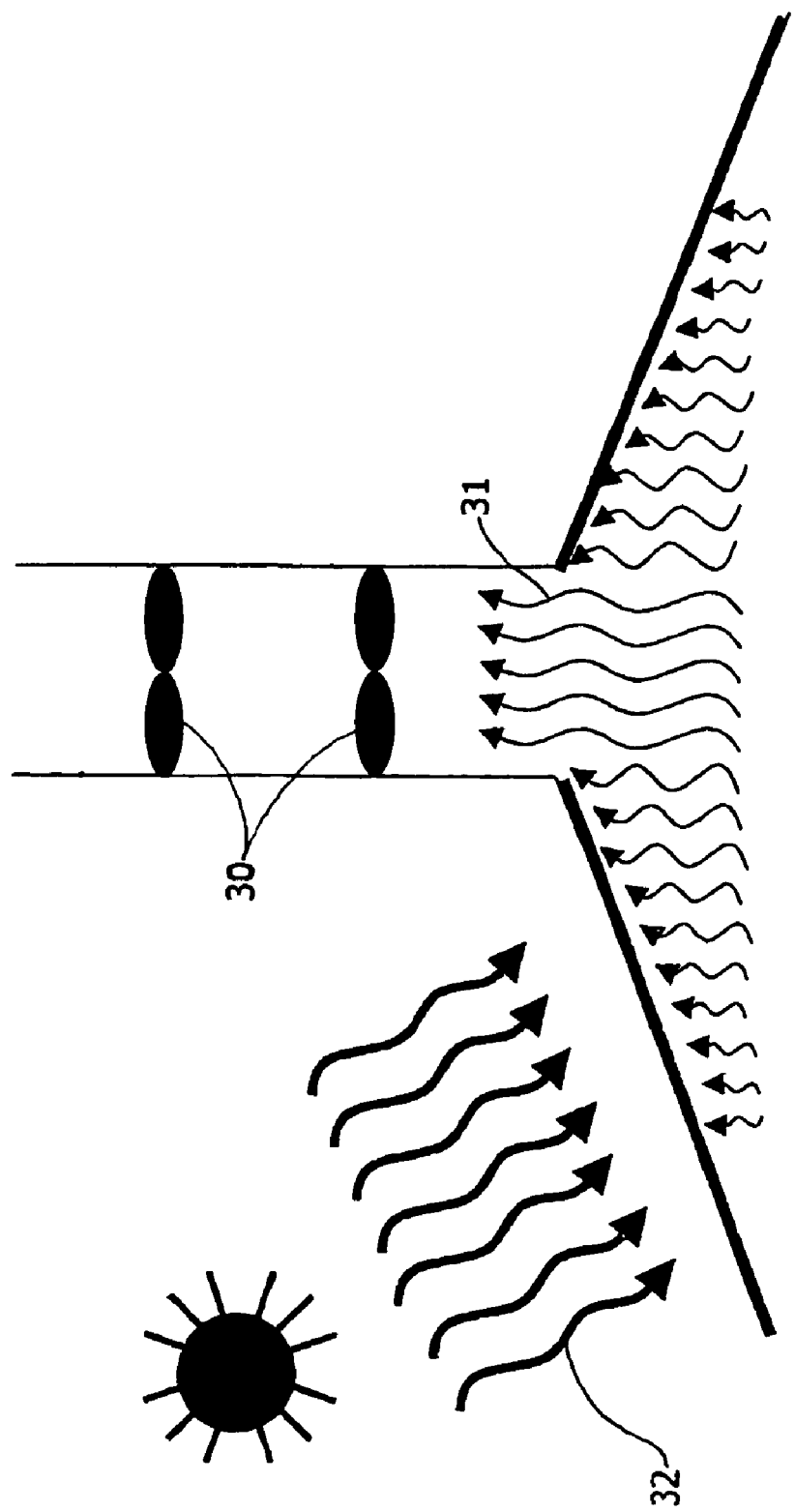
FIG. 21 shows a possible application of the generator inside a pipe through which a fluid flows between areas with different pressures or temperatures.

FIG. 21 shows an application of one or more of the devices according to the invention 30, inside a pipe (for example a chimney) through which a fluid 31 flows between areas at different temperatures or pressures, for example hot air generated by the sun's rays 32.

Since the magnetic suspension offers negligible friction, the starting point for rotation of the wind module comes about for wind speeds below any other type of known wind-based system, in particular for wind speeds below 1 m per second. The efficiency of the annular motor is always better than 95% including for fluid sections below 100 mm and this enables an overall efficiency of conversion of wind energy to electric energy above 37% including for air fluid sections below 100 mm in diameter for a typical wind speed of 5 m per second.

The panel according to the invention may for example be mounted on a vehicle to supply electric loads when the engine is switched off, or it may be used to provide an independent power supply to systems of street lighting or luminous road panels, in windy areas, or in pipes, chimneys, ducts for hot air or more in general in channels which link areas at different pressures.

A preferred utilisation of the wind panels relates to means of transport. The panel may in particular be set on the roof or bonnet or boot of a car and may be raised manually or mechanically when the vehicle is stationary in a car park. The panel may in particular be an integral part of the bonnet, boot or roof of the vehicle.

The panel may be folded for ease of transport to provide power for portable systems such as personal computers or other electronic devices.

Another possible utilisation is that of the independent generation of energy for camping activities or as a buffer system for emergency illumination in homes, or also as a charging station for ultra-light electric vehicles.

Another possible utilisation of the device is to generate, with high efficiency fluid flows (for example ventilator); this function may be achieved by replacing the electronic system to rectify, regulate and manage energy with an active diode bridge or with an inverter having one or more phases, by one or more position sensors, for example Hall effect position sensors capable of detecting the relative stator-rotor position, and by an electronic control module.

In an alternative solution, the panel presents a single wind turbine or a plurality of wind turbines for example up to an overall diameter in the order of one meter. A device of this type may for example also be associated with a street lamp or similar, to provide the electric energy necessary to supply the lamp of the street lamp.

Naturally, the principal of the invention holding good, the embodiments and construction details may be widely varied with regard to what is described and illustrated here as a simple example without thereby departing from the sphere of the present invention.

What is claimed is:

1. Electric generator device comprising:
   a panel bearing
   a plurality of generators each comprising:
   an electric generator machine including
   a stator and
   a rotor, in which the rotor, acting as
   an inductor, is in the form of
   a ring holding a distribution of magnetic poles along its periphery and having
   a central part bearing one or more blades of
   a fan and in which the stator is in the form of
   a ring surrounding the rotor and bearing windings capable of linking the magnetic field generated by said magnetic poles when the rotor is caused to rotate by a fluid flow actuating said fan and in which the rotor is supported in rotation by the stator through
   a means for rotor support of the magnetic type.

2. Device according to claim 1, wherein the rotor presents a central opening solely occupied by the blades of a fan destined to be actuated by a fluid flow directed parallel to the axis of the rotor.

3. Device according to claim 1, wherein the rotor bears a fan projecting axially from the body of the rotor and the stator, and destined to be actuated by a fluid flow substantially orthogonal to the axis of the rotor.

4. Device according to claim 1, wherein said means for rotor support of the magnetic type a magnetic bearings comprising an annular permanent magnet borne by the stator, and a ring borne by the rotor disposed concentrically within the ring borne by the stator and comprising a permanent magnet or a paramagnetic material such as aluminum.

5. Device according to claim 1, wherein said means for rotor support of the magnetic type comprises one or more windings borne by the stator facing on to magnetic poles borne by the rotor.

6. Device according to claim 1, wherein both the rotor and the stator present intermediate cylindrical portions disposed concentrically within each other, and conical end portions diverging outwards, and in that the magnetic poles of the rotor and the windings of the stator are borne by said cylindrical portions of the rotor and stator, and that said means of magnetic support are provided in correspondence with said diverging conical end portions.

7. Device according to claim 6, wherein each rotor-plus-stator unit incorporates three electric generating machines with rotor magnetic poles and stator windings predisposed both in correspondence with said cylindrical portion and in correspondence with said diverging conical end portions of rotor and stator.

8. Device according to claim 1, wherein the stator bears one or more windings capable of producing a magnetic field to control the relative position between rotor and stator.

9. Device according to claim 4, wherein the permanent magnets comprise thin layers of granular composite material for example Sm—Co—Fe.

10. Device according to claim 1, wherein the stator is constituted of composite material SMC.

11. Device according to claim 10, wherein the composite material SMC is of variable density and permeability obtained for example through inclusion of elementary particles (magnetic domains) of variable density.

12. Device according to claim 11, wherein the magnetic composite SMC is ordered, that is the elementary magnetic domains are included in the inorganic or organic polymeric matrix according to a predetermined order capable of defining a preferential direction of the magnetic flux.

13. Device according to claim 1, wherein the windings of the stator are in "ironless" configuration that is to say without ferromagnetic structures to channel the magnetic flux.

14. Device according to claim 1, wherein the magnetic poles are disposed in a "Halbach array" configuration, possibly without the presence of the iron ring.

15. Device according to claim 1, wherein the body of the fan is of material selected from among ultra-light plastic material, nano-composites for example of the montmorrillonite type or polymeric type with carbon nano-tubes or in general fibrous carbon polymer material.

16. Device according to claim 1, wherein the panel is supported by a supporting structure with possibility of orienting it with regard to the wind.

17. Device according to claim 16, wherein the panel is divided into sub-units orientable in the wind independently of each other.

18. Device according to claim 1, wherein the panel bears a single wind turbine and is associated with a street-lamp structure, to supply power to the luminous source with which the street-lamp structure is equipped.

19. Device according to claim 1, wherein the output terminals of each generator are connected to an energy management unit each through a respective rectifying bridge, the circuit connecting the generators also including a DC/DC regulator-converter and a DC/AC regulator and converter, as well as an energy storage unit for example consisting of a battery, said energy management unit being predisposed to manage the connection of individual electric generators to each other, in such a manner that connections may be made in series or in parallel, as well as managing energy transfer among the elements in the circuit such as for example from the generators to the storage unit, or from the generators to the converters or from the storage unit to the converters, said energy management unit being predisposed to activate and manage the converters to provide energy at one or more loads.

20. Device according to claim 19, wherein said energy management unit is predisposed to set up a connection in parallel among the generators inserting a DC/DC converter of the voltage-regulated boost type at the output from each generator and from each respective rectifier in such a manner as to have the same output voltage from each rectifier-boost unit.

21. Device according to claim 19, wherein said energy management unit is predisposed to make a connection in series among the generators and in that a DC/DC converter of the boost type is predisposed in order to obtain the desired bus voltage.

22. Device according to claim 1, wherein it is predisposed to be mounted on a car to supply electric loads when the engine is switched off.

23. Device according to claim 22, wherein it is mounted flush with the roof, bonnet or boot of the car, and brought into operation through an automatic or a manual device.

24. Device according to claim 23, wherein it is predisposed to supply power to a heating or air-conditioning system when the engine is switched off, to provide conditions of minimum comfort even before the engine is switched on.

25. Device according to claim 23, wherein it is predisposed to recharge the electric battery of the car when the engine is switched off.

26. Device according to claim 23, wherein it is predisposed to supply power to entertainment devices (for example car stereo) for long periods when the engine is switched off.

27. Device according to claim 1, wherein the device is inserted into a duct in which a fluid flow exists between two zones at different pressures and/or temperatures.

28. Device according to claim 27, wherein it is inserted inside a chimney in civil or industrial applications for the recovery of the energy provided by flows of smoke or hot air.

29. Device according to claim 27, wherein it is inserted inside a chimney through which hot air flows are generated by an external heat source, for example the sun's rays.

30. Device according to claim 1, wherein the device is predisposed to be installed along a road to provide an independent power supply to street illumination systems or luminous street panels.

31. Device according to claim 1, wherein it is predisposed to provide a power supply to electronic devices such as portable computers, cellular telephones, personal entertainment devices or games.

32. Device according to claim 1, wherein the device is predisposed to be used as an independent generator of energy for camping activities.

33. Device according to claim 1, wherein the device is predisposed to be used as a buffer system for emergency illumination in homes.

34. Device according to claim 1, wherein the device is predisposed to be used as a recharging station for ultra-light electric vehicles.

35. Device according to claim 3, wherein it has a vertical rotation axis transversal with regard to the direction of flow of air, hot air or fluid that causes it to rotate, in the presence of an electric generating machine of annular type and a pair of magnetic bearings entirely situated on the base of the device.

36. Device according to claim 35, wherein the pair of magnetic bearings comprises a magnetic bearing situated at the base of the device and a magnetic bearing situated at the top of the device.

37. Device according to claim 1, wherein the electronic system for rectifying, regulating and managing energy consists of one or more position sensors, of a control system and of an active bridge or inverter, capable of causing the device to operate as a generator of fluid flows, for example air.

* * * * *